United States Patent [19]

Tompkins

[11] 3,986,395
[45] Oct. 19, 1976

[54] VELOCITY MEASUREMENT INSTRUMENTS

[76] Inventor: Daryl Mark Tompkins, 2044 Cherri Drive, Falls Church, Va. 22043

[22] Filed: Nov. 11, 1975

[21] Appl. No.: 631,131

[52] U.S. Cl. .................................. 73/189; 73/228
[51] Int. Cl.² ...................................... G01F 1/28
[58] Field of Search .............. 73/189, 228, 194 E

[56] References Cited
UNITED STATES PATENTS

| | | | |
|---|---|---|---|
| 3,164,990 | 1/1965 | Henness et al. | 73/228 |
| 3,212,329 | 10/1965 | Bisberg | 73/189 |
| 3,216,247 | 11/1965 | Miller | 73/189 |
| 3,217,536 | 11/1965 | Motsinger et al. | 73/189 |

Primary Examiner—Herbert Goldstein

[57] ABSTRACT

Apparatus for determining the speed and direction of a moving medium such as the atmosphere. The apparatus includes a sensing element which is exposed to the wind to be subjected to forces which displace the sensing element from its rest position. Attached to the sensing element is a dielectric slab which moves in an electric field. The sensing element resides in an equilibrium position determined by the forces applied by the moving medium and those applied by an electric field between the dielectric slab and a set of conductive plates. The displacement of the sensing element is variously determined to indicate the speed and direction of the wind.

1 Claim, 3 Drawing Figures

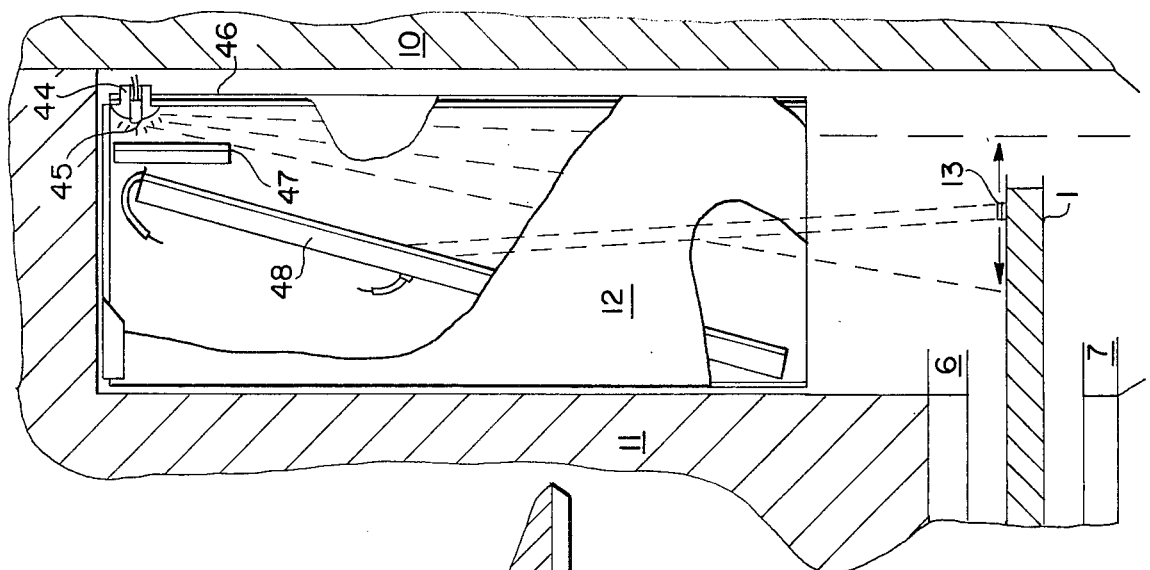
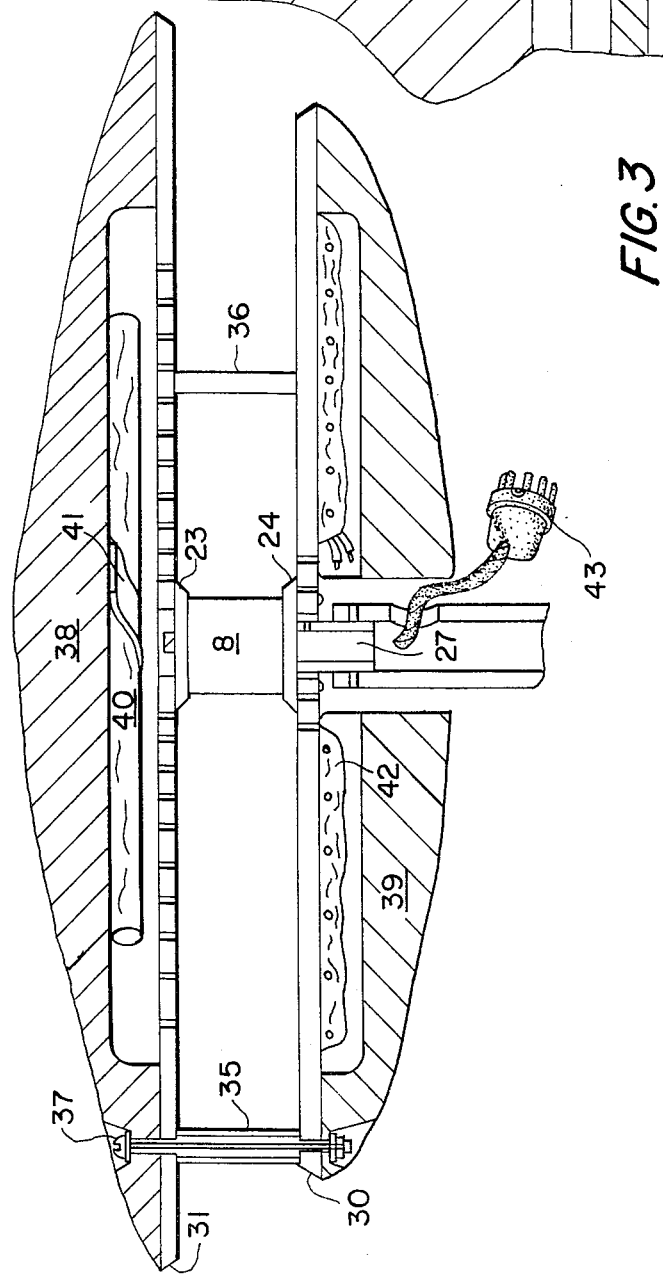
FIG. 3
FIG. 2

VELOCITY MEASUREMENT INSTRUMENTS

SUMMARY OF THE INVENTION

The invention contemplates the use of a dielectric slab positioned between two electrically charged conductive plates, the center regions removed. The slab and plates are so constructed that the movement of the slab in any direction will remove increasing portions of the slab from the region between the conductive plates.

An exposed sensing element is attached to the dielectric slab whereby a moving medium, such as the atmosphere, will apply displacing forces to the slab. The slab, held apart from but parallel to the conductive plates by flexible filaments, is free to move in planes parallel to the conductive plates. The charged plates and dielectric slab constitute a variable capacitor on which work must be done by the moving medium to displace the dielectric from its rest position.

This embodiment of the invention includes a first detector for determining the displacement component with respect to a direction of reference and a second sensor for determining a second displacement component normal to the first detector.

This invention has other advantages which will appear from the following description of a particular embodiment of the invention in conjunction with the accompanying drawings, in which:

BRIEF DESCRIPTION OF THE DRAWINGS

FIG. 2 is a cross sectional view of the preferred shelter for the sensor including an exterior view of the sensing element;

FIG. 3 is a sectional view of a first displacement detector 14 with parts of the housing not cut away.

DETAILED DESCRIPTION OF THE INVENTION

Figure 1:
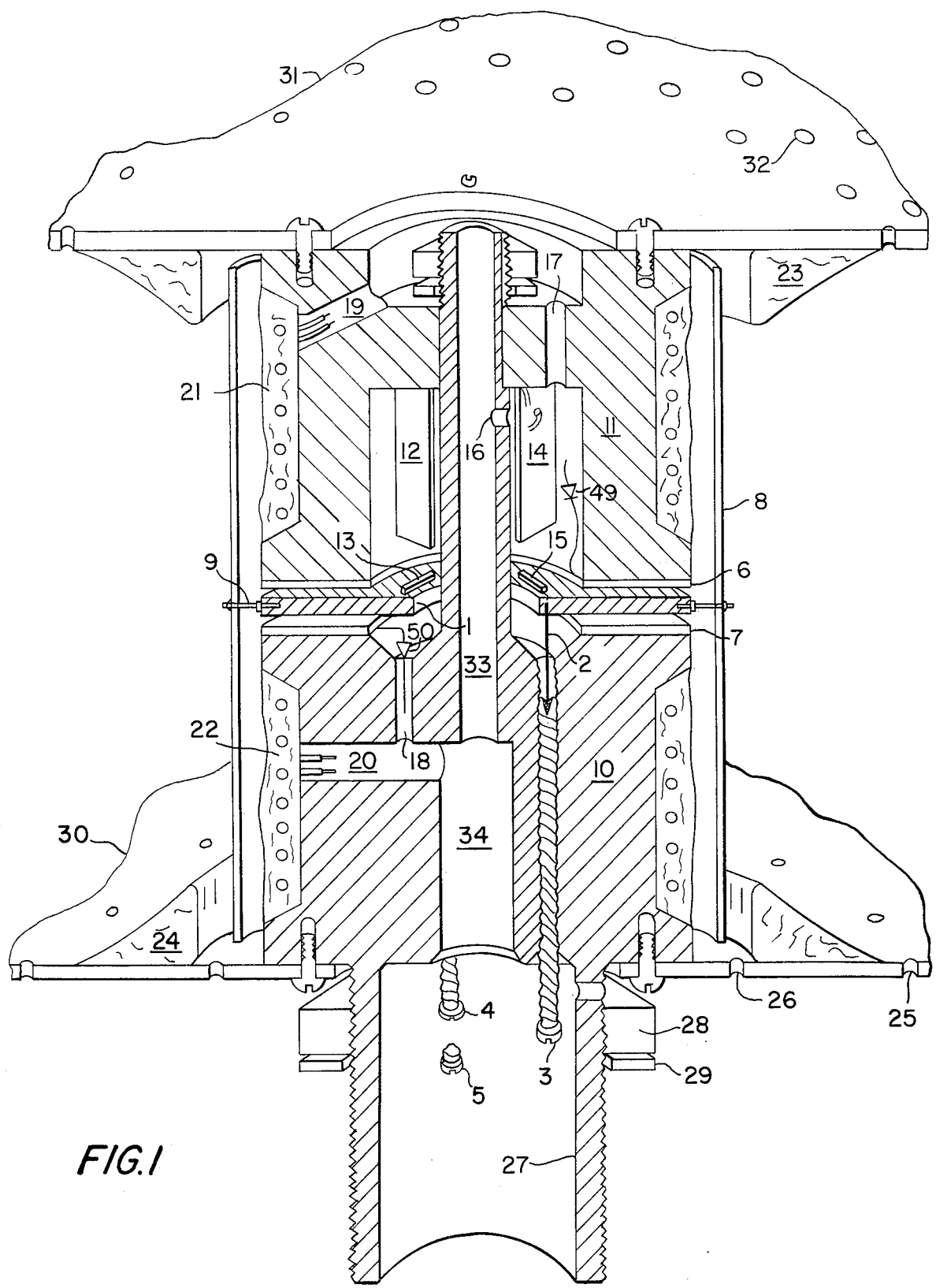
FIG. 1 is a perspective cross sectional view of the invention showing the preferred sensor configuration.

With reference to FIG. 1 of the drawings, the particular embodiment shown there of the invention comprises, in general, a dielectric slab 1, a pair of electrically conductive plates 6 and 7, a sensing element 8, a lower supportive structure 10, an upper supportive structure 11, a plurality of flexible filaments 2, and means for directing the flow of a moving medium against the sensing element; air foils 23 and 24, and parallel plates 30 and 31.

The dielectric slab 1 is rigidly connected to the sensing element 8 by a plurality of supportive wires 9. The dielectric slab and the sensing element move together under the influence of a moving medium, such as the atmosphere. The position of the dielectric slab is then measured to indicate the speed and direction of motion of the atmosphere relative to a reference direction.

The motion of the dielectric slab 1 is restricted by flexible filaments 2 such that the dielectric slab is always parallel to the conductive plates 6 and 7. The conductive plates together with the dielectric slab constitute a variable capacitor. The position of the dielectric slab relative to the bottom conductive plate is maintained by flexible filaments 2 and adjustment screws 3, 4 and 5, which move the flexible filaments. The position of the top conductive plate 6 and position sensors 12 and 14 is maintained relative to the bottom conductive plate 7, the dielectric slab 1, and mirrors 13 and 15, by the lower supportive structure 10 and the upper supportive structure 11.

The upper supportive structure contains access holes 17 and 19 to allow for necessary electrical connections. The lower supportive structure contains access holes 16, 18, 20, 33 and 34 to allow for further necessary electrical connections. The supportive structures 10 and 11 are constructed of materials which are heat conductive but electrical insulators.

To prevent condensation of the sensing element 8 or within the detector cavity containing position detectors 12 and 14, electrical heating elements 21 and 22 are provided. Additional heating elements 42 are provided as shown in FIG. 2 to prevent wind-blown snow from collecting between plates 30 and 31. Water collecting on the bottom plate 30 or the sensing element 8 is drained by holes 25 and 26.

To ensure minimum disruption of the wind by the invention, Airfoils 38 and 39 are provided which are held in place by screws 37. The spacing of the parallel plates 30 and 31 is maintained by spacers 35 and 36.

The top Airfoil 38 contains an insect repellent 40 held in place by clamp 41. A plurality of vent holes 32 allow the insect repellent fumes to enter the space between the parallel plates 30 and 31.

The invention is held in position by threaded section 27 and by nut 28 and locking washer 29. Connection to power and recording equipment is provided by plug 43.

FIG. 3 is a cutaway view of a first position detector 12, for determining the displacement component with respect to a direction of reference. A first mirror 13 is mounted on the dielectric slab 1 with its long axis normal to the direction of motion to be detected by the first detector 12. A light source 45 held in position by grommet 44 illuminates a portion of mirror 13 with a light cone having its greatest width parallel to the direction of movement to be sensed. The mirror 13 reflects a thin cone of light to a light sensor 48 which is otherwise shielded from the light source 45 by a light screen 47. The light sensor 48 responds to point of illumination rather than intensity of illumination. The point of illumination is a function of that component of the dielectric slabs movement which is normal to the long axes of the mirror 13. The enclosure 46 protects the light sensor 48 from natural light or light emitted by a second position detector 14 or second mirror 15. The second position detector and mirror pair is mounted with its sensitive direction normal to that of the first position detector and mirror. The necessary electronic circuits required to interpret the signals generated by light detectors 48 can be made from classical circuits known from those skilled in the art, or commercially available in the form of integrated circuits. By electronically performing division, squaring, adding and square root functions on the signals generated by light detectors 48, the direction and degree of motion of dielectric slab 1 and sensor 8 may be easily known and related empirically to the speed and direction of the atmosphere.

The operation of the invention will now be more fully explained to indicate how the parts enumerated above operate together to perform a useful function in a new and novel manner.

The invention is attached to a supporting pole or probe which holds the invention in the flow to be measured. The movement of the atmosphere is restricted by parallel plates 30 and 31 so that only 2 components of the 3 dimensional flow of the atmosphere will move the sensing element 8. The sensing element is protected from rain, snow, hail and the like by the Airfoils 38 and 39. Protection from insects is provided by insect repellent 40. Because of the dielectric slab and sensing element have low mass to increase their sensitivity they are protected from condensation by heating elements 21 and 22 which also protect the instrument from changes in dielectric constant which occur with temperature.

The parallel conductive plates are to be kept at a constant electrical charge by supplying a constant maximum voltage to the plates through a pair of diodes 49 and 50. When the dielectric slab 1 is in its center position, the capacitance and electric charge of the system will be maximized. When the dielectric slab is displaced by the movement of the wind, the diodes 49 and 50 will prevent the loss of charge on the conductive plates 6 and 7. By this method, the conductive plates 6 and 7 will always have a constant electric charge which will be recalibrated at any moment the dielectric slab is in its rest position. The sensitivity of the invention may be altered by changing the level of constant electric charge on the conductive plates and/or by changing the dielectric material used to construct the dielectric slab 1.

The work required to remove a portion of a dielectric slab from between two constantly charged conductive plates is well known to those skilled in the art. The capacitor and dielectric act as a spring against which the atmosphere does work in displacing the sensing element. Because the sensing element 8 and dielectric slab 1 may have small mass, the sensitivity and response time of this invention is increased over the prior art except for very expensive and complicated instruments.

Although I have described a preferred embodiment of the invention, it is understood that the present disclosure has been made by way of example and that numerous changes in the details of construction and the combination and arrangement of parts may be made without departing from the spirit and scope of the invention as hereinafter claimed.

What is claimed is:

1. Apparatus for determining the speed and direction of relative motion of a moving medium and with regard to a direction of reference, said apparatus comprising a dielectric slab connected to a sensing element which is exposed to the said medium and displaced by movements of said medium, a set of supportive filaments which are adjustable in height and which limit the vertical movements of the said slab while allowing free horizontal movements, a first conductive plate supported over a second conductive plate, said dielectric slab located between the two conductive plates, said plates maintained at a constant electrical charge such that the two plates and slab act together as a spring against which the moving medium must do work, a first supportive structure and a second supportive structure which hold the conductive plates and which when assembled form a rigid electrically insulated structure, a displacement detector for determining the displacement of said slab from its rest position relative to a direction of reference, a second displacement detector for determining a second displacement of said slab from its rest position at right angles to the first one.

* * * * *